May 20, 1969  C. J. NEWMAN  3,445,645

ARMORED SIDE MARKER LAMP

Filed Aug. 4, 1966

Inventor
Charles J. Newman

Wheeler, Wheeler, House & Clemency
Attorneys

United States Patent Office 3,445,645
Patented May 20, 1969

3,445,645
ARMORED SIDE MARKER LAMP
Charles J. Newman, Madison, Ind., assignor to The Grote Manufacturing Company, Inc., Madison, Ind., a corporation of Kentucky
Filed Aug. 4, 1966, Ser. No. 570,263
Int. Cl. B60q 1/32
U.S. Cl. 240—8.2      3 Claims

ABSTRACT OF THE DISCLOSURE

A very flat base supports one or more lamp sockets and lamps with a minimum projection from the side of a truck on which the base is mounted. A shield, usually colored, has a snap connection with a rib on the base. In the event the shield is dislodged from the base by wiping contact with a tree branch or the like, the lamp fixtures and their connections are protected by an internal armor which projects from the base at both sides of the lamps and tends to prevent the lamps and their electrical connections from damage and shorting. The armor is without appreciable effect on the photometric output, and does not detract from the appearance of the unit.

The integral armor comprises a pair of flanges integral with the base. These extend along opposite sides of the base and project therefrom materially beyond the margin of the rib with which the colored shield is engageable. The flanges are not of uniform thickness but are desirably reinforced in the interior of the fixture by posts which are integral with the base and the flanges provide substantial support against destruction by the wiping action referred to. The outer margins of the armor flanges are curved about the lamps and are also convex in their projection from the base to tend to cam obstacles aside. Because of the form and limited extent of the flanges and the provision of the posts in the particular positions shown, the desired protection is achieved with practically no interference with the illumination.

BACKGROUND OF THE INVENTION

Side marker lamps having plastic bases and shields are known but they have been peculiarly subject to injury in the event the lamp was wiped by a tree limb or the like during motion of the truck to which the lamp is applied. In the past, such wiping injury has not only tended to destroy the shield but has caused short circuiting of the truck wiring due to injury to the lamp sockets and their electrical connections.

The instant invention contemplates that the lamp sockets and wiring will be protected by portions of the base which are independent of the shield and which tend to remain effective for protection of the electrical parts even if the shield is wiped off.

DESCRIPTION OF THE INVENTION

Figure 1:
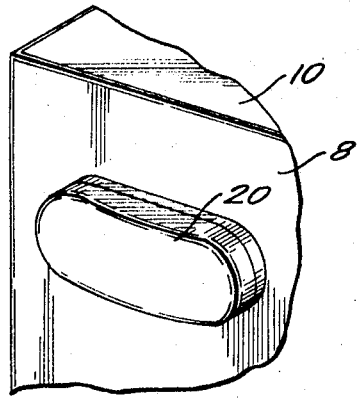
FIG. 1 is a view in perspective of a side marker lamp embodying the invention, portions of a truck body being fragmentarily illustrated.
Figure 2:
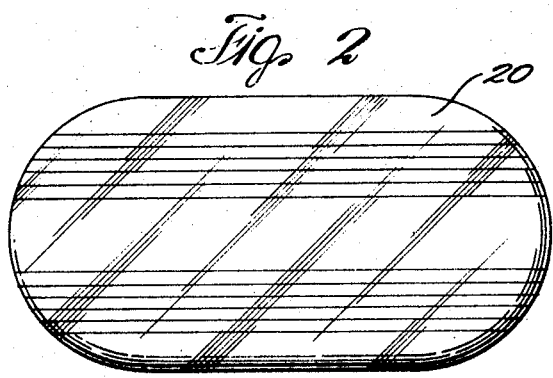
FIG. 2 is an enlarged detail view of the lamp, showing it in plan as viewed separately or in side elevation as viewed on the side of a truck.
Figure 3:
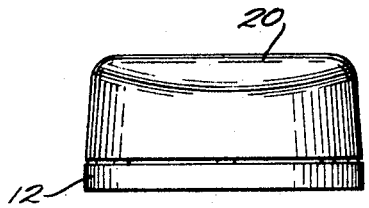
FIG. 3 is an end elevational view of the lamp.

Clearance or side marker lamps are commonly used along the upper side portions 8 of a truck body 10 as shown in FIG. 1. The present invention contemplates the use of an elongated base 12 of relatively heavy plastic. The base has rounded ends and has a flange 14 completely around its perimeter for mounting the usual transparent shield. In accordance with the present invention, the flange has minimum projection above the base. It is encircled by a rib or segments of a rib as shown at 16 with which is releasably engaged by snap action the grooved lower margin 18 of a transparent shield 20 which is commonly made of colored plastic. The shield serves to extrude dirt and water from the lamps 22 and the fixtures which support and electrify these lamps. The transparent shield 20 may be clear or it may be colored to tint the light emitted by the lamps, the shield usually being red or sometimes amber.

The lamp mountings used in lieu of sockets in the instant device form no part of the present invention. As illustrated, these include spring clips 26 which engage the respective lamp bases and are connected to one side of the electrical supply line. The fixtures also include spring contacts 28 which engage the center terminal contacts of the lamps and are connected to the other side of the electrical supply line, as by the wire 30.

Figure 4:
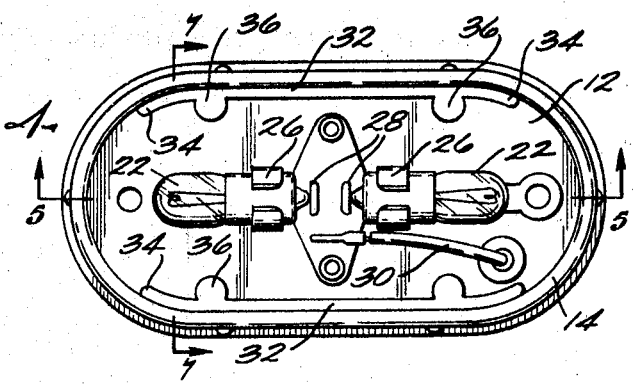
FIG. 4 is a plan view of the lamp base with the protective shield removed.

The lamps and their mountings project from the base for a distance greater than the height of the flange 14 with which the base is provided. It is advantageous that the base per se be kept as low as possible for minimum projection from the side 8 of the truck body 10. In the event of brushing contact of a tree branch or the like with the lamp, such as may dislodge the transparent flexible shield 20, I have found it possible to protect the electrical equipment by the provision in the interior of the lamp of relatively heavy upstanding flanges 32 which are elongated longitudinally of the base at opposite sides thereof and project integrally from the base slightly beyond the surfaces of the lamps and their fixtures which would otherwise be exposed when the shield 20 is dislodged. Posts 36 are cast integrally with the respective flanges 32 and with the base and are generally cylindrical as shown in FIG. 4. The height of each post is substantially equal to the projection of the flange 32 from the base and the location of the respective posts is substantially opposite the respective lamps. Thus each lamp is located between an opposed set of posts which reinforce at these points the flanges 32 which guard the lamps and their fixtures.

Figure 5:
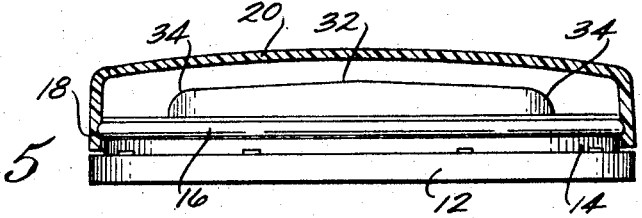
FIG. 5 is a view of the lamp base in side elevation, the shield being shown in section on the line 5—5 of FIG. 4.
Figure 7:
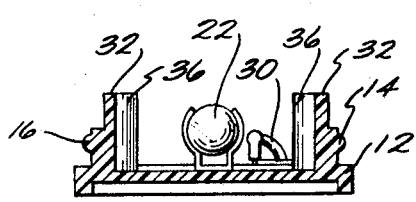
FIG. 7 is a view of the lamp base in transverse section on the line 7—7 of FIG. 4.
Figure 6:
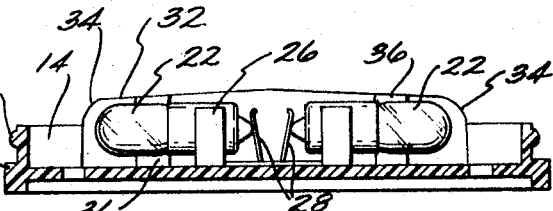
FIG. 6 is a view of the lamp base in section on the line 5—5 of FIG. 4.

At their ends 34 the flanges preferably curve inwardly toward each other about the lamps and they also are convex on their upper margins as clearly shown in FIGS. 4, 5 and 6.

While obviously the strength of the so-called armor is not ordinarily adequate to deal with a blow such as might result from contact with another vehicle or with a building wall, nevertheless the armor construction herein disclosed does protect the electrical equipment from damage of a type which has heretofore been destructive of such equipment and has been a frequent source of short circuiting of the truck's wiring. The curves of the armored flanges, reinforced by the posts disposed in the specific locations specified, will tend to cam aside a tree branch which might otherwise be destructive. If the tree branch merely dislodges the shield, the same or substitute shield can readily be replaced.

I claim:
1. A side marker lamp for trucks or the like which comprises a base having a flange about its perimeter and a shield having detachable rib and groove connection with said flange, electrical fixture means mounted on the base and provided with lamp menas, armor flanges connected with the base and disposed in the interior of the shield with lamp protecting portions in spaced relation to the shield and projecting from the base beyond the said first mentioned flange and beyond said fixture means and lamp means and serving as armor for the protection of the fixture and lamp means aforesaid, said armor flanges reinforcing the flange first mentioned and projecting sufficiently farther from the base to lie at opposite sides of the fixture and lamp means aforesaid.

2. A lamp according to claim 1 in which the said armor flanges have reinforcing posts integral therewith and with the base and disposed at points spaced both laterally of the base and longitudinally thereof to lie opposite the fixture and lamp means respectively mounted on the base, the base having two fixture means and two lamp means projecting toward opposite ends of the base between pairs of said posts.

3. An armored side marker lamp for vehicles, said lamp comprising a generally flat base of elongated form centrally provided with lamp bulb mountings and electrical connections from lamps projecting from said mountings toward opposite ends of the base, said base having a shallow flange substantially continuous about its perimeter and spaced from the lamp bulb mountings, a light transmitting shield releasably mounted on said flange, said shield and flange having snap-rib-and-groove means in detachable connection, the shield having a cavity adapted to enclose said mountings and lamp bulbs mounted thereby, and armored means for the protection of said mountings and bulbs and comprising flanges extending along opposite sides of the base and integral with the flange first mentioned and with said base and projecting from the base materially beyond the flange first mentioned and spaced within said shield, the flanges comprising said armor means having end portions respectively curved about the mounting means on said base and having convex margins remote from the base whereby the flanges constituting the armor means tend to cam obstructions away from said base for the protection of the lamp bulbs and from the mounting means therefor which are disposed between said last mentioned flanges.

References Cited

UNITED STATES PATENTS

| | | | |
|---|---|---|---|
| 1,305,696 | 6/1919 | Dawes | 240—102 |
| 3,145,933 | 8/1964 | Dickson | 240—8.3 XR |
| 3,184,590 | 5/1965 | Nagel | 240—8.2 XR |

FOREIGN PATENTS 850,681   10/1960   Great Britain.

NORTON ANSHER, *Primary Examiner.*
ROBERT P. GREINER, *Assistant Examiner.*

U.S. Cl. X.R.

240—102

UNITED STATES PATENT OFFICE
CERTIFICATE OF CORRECTION

Patent No. 3,445,645            May 20, 1969

Charles J. Newman

It is certified that error appears in the above identified patent and that said Letters Patent are hereby corrected as shown below:

Column 1, line 25, "integral", first occurrence, should read -- internal --. Column 3, line 2, "menas" should read -- means --.

Signed and sealed this 21st day of April 1970.

(SEAL)
Attest:

Edward M. Fletcher, Jr.            WILLIAM E. SCHUYLER, JR.
Attesting Officer                 Commissioner of Patents